United States Patent [19]

Greene et al.

[11] Patent Number: 5,024,512
[45] Date of Patent: Jun. 18, 1991

[54] MICROFILM READER WITH MICROFILM AND RETICLE IMAGES PROVIDED TO EACH OF TWO BINOCULAR EYEPIECES

[75] Inventors: Arnold H. Greene, Newton, Mass.; Harold E. Holden, St. Johnsbury, Vt.

[73] Assignee: American Photo Systems, Inc., St. Johnsbury, Vt.

[21] Appl. No.: 309,007

[22] Filed: Feb. 7, 1989

Related U.S. Application Data

[63] Continuation of Ser. No. 888,114, Jul. 18, 1986, abandoned.

[51] Int. Cl.$^5$ .................. G02B 21/20; G02B 27/02; G02B 27/34
[52] U.S. Cl. .................... 350/514; 350/507
[58] Field of Search ................ 350/514–517, 350/523, 529, 530, 508, 507

[56] References Cited

U.S. PATENT DOCUMENTS

| Re. 29,194 | 4/1977 | Ambrose et al. | 350/519 |
|---|---|---|---|
| 352,639 | 11/1886 | Allen | 350/522 |
| 1,939,161 | 12/1933 | Bestelmeyer | 88/24 |
| 1,974,606 | 9/1934 | Fassin | 88/24 |
| 2,123,882 | 7/1938 | Draeger | 350/523 |
| 2,143,632 | 1/1939 | Ott | 350/515 |
| 2,674,152 | 4/1954 | Wilkinson | 350/507 |
| 2,882,790 | 4/1959 | Broms | 88/24 |
| 3,228,283 | 1/1966 | Fulton et al. | 88/24 |
| 3,270,652 | 9/1966 | Mason et al. | 95/86 |
| 3,373,440 | 3/1968 | Jenkins et al. | 346/107 |
| 3,376,762 | 4/1968 | Brault | 77/5 |
| 3,398,631 | 8/1968 | McGivern et al. | 350/515 |
| 3,401,999 | 9/1968 | Kephart et al. | 350/530 |
| 3,442,588 | 5/1969 | Squassoni et al. | 355/54 |
| 3,472,585 | 10/1969 | Halberg et al. | 353/27 |
| 3,531,197 | 9/1970 | King | 355/18 |
| 3,565,534 | 2/1971 | Chaban | 350/515 |
| 3,575,098 | 4/1971 | Jones | 95/86 |
| 3,616,737 | 11/1971 | Foslien | 95/37 |
| 3,762,797 | 10/1923 | Heller | 350/522 |
| 3,807,846 | 4/1974 | Swank | 353/27 |

(List continued on next page.)

FOREIGN PATENT DOCUMENTS

| 553797 | 7/1932 | Fed. Rep. of Germany | 350/522 |
|---|---|---|---|
| 1235006 | 2/1967 | France | 350/507 |
| 1075217 | 2/1984 | U.S.S.R. | 350/523 |
| 2138240 | 10/1984 | United Kingdom | |

OTHER PUBLICATIONS

Research Disclosure, No. 161, Sep. 1977, pp. 26–27, "Reversal Processing of Silver Halide Color Photographic Materials".

Primary Examiner—Jon W. Henry
Attorney, Agent, or Firm—Weingarten, Schurgin, Gagnebin & Hayes

[57] ABSTRACT

A process for high resolution high accuracy photoreduction of radiographs, a rotatable photographic copy stand for the photoreduction process, and a high resolution high accuracy microfilm reader with built-in measuring capabilities are shown. The photoreduction process employs a camera with high precision optics, a high resolution copy film, and a first developing solution containing 0.014 to 0.025 moles per liter of a 3-pyrazolidone as the primary developing agent plus a lesser amount of a secondary developing agent, in a reversal process, to yield positive images having gamma values of 1.00 to 1.05. The copy stand has multiple workstations mounted on a rotatable frame, and several lightboxes. The microfilm reader employs high precision optics throughout, and possesses a variable magnification objective lens, a beam splitter, ultrawide-angle eyepieces, and a movable measuring reticle, the image of which is superimposed upon the image from the objective lens for accurate measurement of features shown on a film being examined. By means of the disclosed process and apparatus, industrial radiographs or other sorts of X-rays are photoreduced and later reenlarged for reexamination and measurement of selected features, with an overall dimensional accuracy of at least 99.9%.

12 Claims, 5 Drawing Sheets

U.S. PATENT DOCUMENTS

| | | | |
|---|---|---|---|
| 3,865,477 | 2/1975 | Gast | 353/11 |
| 3,917,398 | 11/1975 | Takahashi et al. | 355/15 |
| 3,981,575 | 9/1976 | Tanaka et al. | 355/1 |
| 4,017,147 | 4/1977 | Weber et al. | 350/30 |
| 4,026,631 | 5/1977 | Erb | 350/514 |
| 4,027,942 | 6/1977 | Fukushige | 350/514 |
| 4,043,662 | 8/1977 | Garfall | 355/71 |
| 4,077,716 | 3/1978 | Gandini | 355/67 |
| 4,080,056 | 3/1978 | Jesensky et al. | 355/5 |
| 4,100,591 | 7/1978 | Schael | 362/285 |
| 4,128,332 | 12/1978 | Rowe | 355/67 |
| 4,139,387 | 2/1979 | Von Konig et al. | 96/64 |
| 4,220,982 | 9/1980 | Martino | 362/97 |
| 4,225,923 | 9/1980 | Bloemendaal et al. | 362/301 |
| 4,241,392 | 12/1980 | Boone | 362/342 |
| 4,250,358 | 2/1981 | Gilbertson | 200/52 R |
| 4,313,605 | 2/1982 | Stokes et al. | 273/85 |
| 4,334,763 | 6/1982 | Honda et al. | 355/8 |
| 4,387,985 | 6/1983 | Magin et al. | 355/71 |
| 4,515,455 | 5/1985 | Northmore | 354/293 |
| 4,523,094 | 6/1985 | Rossow | 250/311 |
| 4,566,768 | 1/1986 | Bosdet | 354/81 |
| 4,568,179 | 2/1986 | Durbin et al. | 355/67 |

MICROFILM READER WITH MICROFILM AND RETICLE IMAGES PROVIDED TO EACH OF TWO BINOCULAR EYEPIECES

This application is a continuation of application Ser. No. 06/888,114, filed July 18, 1986, now abandoned.

FIELD OF THE INVENTION

This invention relates to photoreduction and viewing of X-ray films, and more particularly to a process and apparatus for high resolution, high accuracy photoreduction of industrial radiographs and accurate retrieval of the photoreduced images.

BACKGROUND OF THE INVENTION

In a number of high-technology fields, as for example the nuclear industry, the aerospace industry, the pipeline industry, and the military, it is frequently required practice to X-ray critical components to screen for defects. The resulting radiographs are sheets of film up to about 14×17 inches. Hundreds of thousands of these radiographs are taken each year and stored for record-keeping purposes. Such storage is very expensive because of the sheer bulk of material involved, and the correspondingly large amounts of storage space required. Storage of individual radiographs also presents possible problems of loss of particular records by theft or misfiling.

Several years ago the Nuclear Regulatory Commission (NRC) revised its regulations to authorize nuclear power plants to photoreduce their records instead of storing the originals. To date, however, it has not been possible to realize the very substantial cost savings such photoreductions would represent, because a process and apparatus for accurately photoreducing these industrial radiographs and recovering them undistorted has not been available. The technical specifications for photoreduction and recovery of the full information content of such radiographs are very severe, the NRC regulations and the ASTM standards requiring optical distortion to be not more than 0.1%. This is because it may be necessary at some later time to measure recorded defects and compare the result to the regulatory code standards. The above standard of accuracy also satisfies or exceeds the requirements of all other producers of radiographs.

Although the requirements for accuracy in the photoreduction and reproduction of industrial radiographs are very high, the standards with respect to optical densities are not so severe. It is not necessary that an acceptable photoreduction and reproduction system reproduce optical densities of the original film with an extremely high degree of accuracy. It is, however, necessary that the relative optical densities of different portions of the films be preserved.

The apparatus and procedures employed routinely in the medical field to photoreduce medical X-rays and reenlarge them for later viewing will not serve for the photoreduction and reenlargement of the industrial radiographs which are the subject of the preset invention, because the demands for accuracy in the medical field are much less severe than in the nuclear regulatory field and in other critical industrial applications. As a result, the photographic processes and apparatus employed to photoreduce and subsequently reproduce medical X-rays do not meet the required standards for photoreduction and subsequent reenlargement of industrial radiographs for regulatory purposes.

Accordingly, it would be very desirable to have available a photographic process and apparatus capable of photoreducing industrial radiographs with extremely high resolution and accuracy, and reenlarging the reduced radiographs with essentially no loss in resolution or accuracy, while simultaneously maintaining the relative optical densities of the original radiographs.

SUMMARY OF THE INVENTION

The above-identified deficiencies of the prior art have been overcome and the desired photographic process and apparatus for photoreducing and subsequently reenlarging industrial radiographs with extremely high resolution, dimensional accuracy, and reproducibility of relative optical densities are provided by the present invention.

In accordance with the invention, industrial radiographs are photoreduced with high resolution and accuracy, and with preservation of relative optical densities of the original film, by application of a process having the following steps: illuminating a radiograph uniformly from the rear; providing a camera having optics that produce no more than 0.1% total distortion in any dimension; determining proper exposure by measuring light transmitted by the light areas and the dark areas of the subject radiograph and combining these light readings appropriately; photographing the radiograph on a high resolution thin emulsion light sensitive silver halide film employing the proper exposure derived for the particular radiograph; and developing the exposed film in a reversal process to a positive image having a gamma value in the range of about 1.00 to about 1.05, the reversal process further including the steps of treating the film with an aqueous first developer solution having a concentration of about 0.014 moles per liter to about 0.025 moles per liter of a 3-pyrazolidone as primary developing agent and including at least one secondary developing agent at a concentration in the first developer solution less than the concentration of the 3-pyrazolidone. Following the first development, the negative is chemically bleached, reexposed, redeveloped with an active developer, treated with a fixing solution, washed, and dried. If desired, several radiographs of a single workpiece may be accurately superimposed and photographed together to form a composite photoreduced image having essentially all of the information contained in the several original radiographs separately.

The photocopying operation is conveniently carried out on an industrial scale by the use of a photographic copy stand having a base, a pedestal mounted on the base, at least one lightbox mounted approximately horizontally on the pedestal, a unitary frame which is attached to the pedestal above the lightboxes in a manner permitting rotation of the frame about the pedestal, a plurality of workstations mounted on the unitary frame, with each of the workstations including a clear flat glass plate and a mechanism for holding an industrial radiographic film on the glass, and at least one camera-supporting arm mounted on the pedestal, each arm being shaped and disposed to hold a camera directly over one of the lightboxes. Multiple original photoreduced positives are thus readily made, providing records for both archival storage and for ready access. Details of operation of the copy stand are presented in the detailed description, below.

The films produced in the photoreduction process discussed above are "blown back" accurately to full scale for reexamination and remeasurement of any features, using a high resolution microfilm reader having a supporting chassis, a focusing mount attached to the chassis in a manner such that it can be positionally adjusted relative to the chassis, a binocular microscope head attached to the focusing mount and including eyepiece tubes and ultrawide-angle eyepieces, a beam splitter assembly attached to the focusing mount and including a beam splitter and a housing for holding the beam splitter, a variable magnification objective lens attached to the beam splitter housing, and a measuring reticle assembly attached to the beam splitter housing, this reticle assembly containing a reticle and means for projecting an image of the reticle into the beam splitter. The optical system taken as a whole produces no more than 0.1% total distortion when the reader is properly adjusted and operated. The operation of the microfilm reader is discussed in the detailed description, below.

DESCRIPTION OF THE DRAWING

The invention will be better understood from a consideration of the detailed description taken in conjunction with the drawing in which.

DETAILED DESCRIPTION OF THE INVENTION

Figure 1:
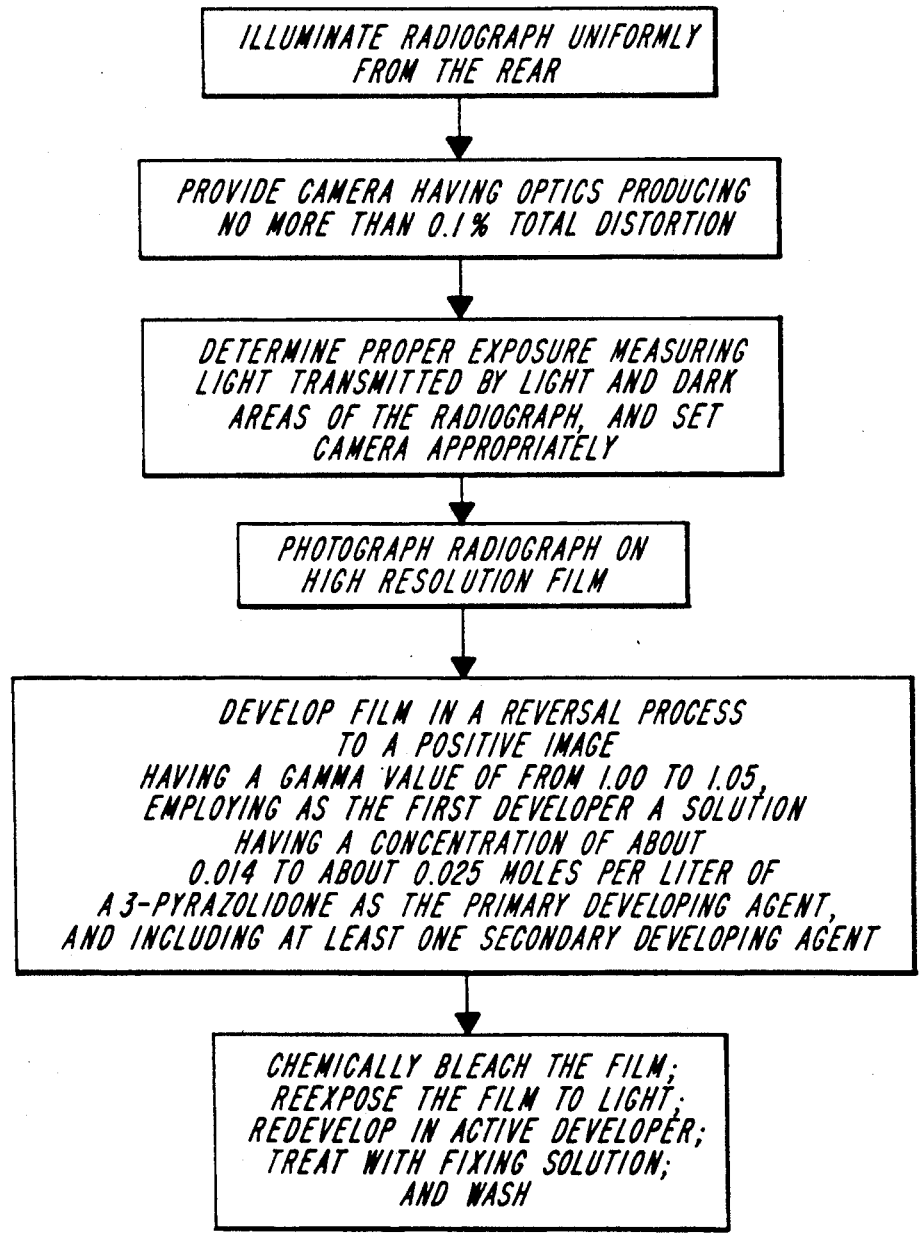
FIG. 1 is a flow chart illustrating the steps of the photoreduction process.

Referring now to FIG. 1, there is shown a schematic flow chart illustrating the steps of a process for photoreducing industrial radiographs with high resolution and accuracy, while maintaining accurate relative optical densities of the original radiograph being photographed. The subject radiograph is first illuminated uniformly from the rear in step 10. This illuminating step is preferably accomplished by means of a lightbox having a lighted surface and a light output which varies by less than 10% over the lighted surface. A camera having optics producing no more than 0.1% total distortion in any dimension is provided in step 12 and a proper exposure is determined in step 14 by measuring the light transmitted by both the light and dark areas of the radiograph and combining these readings appropriately.

A high quality 35 mm camera is preferably employed in this process. The camera lens should produce no more than 0.1% distortion in any dimension, and should vary less than one-third stop from center to edge in its light transmitting properties. Suitable commercial lenses meeting these criteria are the 55 mm Micro Nikkor and the 50 mm Olympus Micro Zuiko.

Commercial camera lenses may typically vary in their focal lengths by as much as 5% from the nominal focal length. This is not a critical factor, however, since compensating adjustments are made in the camera mount during set-up. To ensure the accuracy of measurements taken from the reduced image, a scale having the same graduations as the reticle image of the microfilm reader discussed below and positioned at the same plane as the original material is photographed with the radiograph. Aligning the photographed scale with the reticle image and adjusting the magnification of the reader to match guarantees accuracy.

Figure 1A:
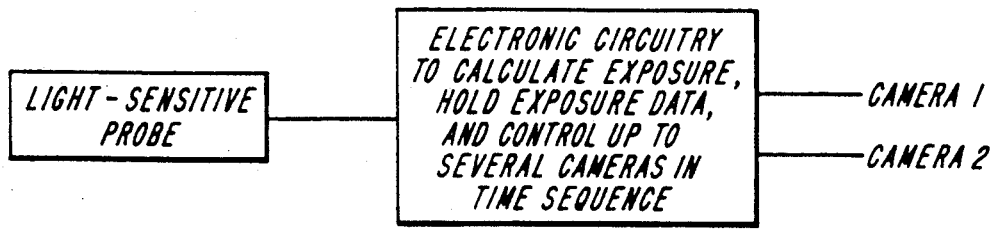
FIG. 1a is a schematic of the exposure-calculating and camera-controlling circuitry.

The determination of proper exposure in step 14 is made with a light sensing probe which is preferably deployed close to the area of the radiograph being measured, for highest accuracy in the determination of the light transmitted by the dark and light portions of the radiograph. The light sensing probe is connected to electronic circuitry which calculates the proper exposure, holds this data, and sets the exposures on one or more cameras appropriately at proper times in the photographic sequence. This exposure calculation and camera setting are preferably accomplished by modifying the camera employed in the photographic process, removing the light sensing element from its normal position behind the camera lens, mounting it in a moveable probe, and connecting it to electronic circuitry engineered to calculate a proper exposure from the probe outputs, to store such exposure data, and to transmit such exposure data to up to several cameras in delay sequence. A schematic of the exposure-calculating and camera-controlling circuitry is shown in FIG. 1a.

After the proper exposure has been determined as discussed above, and the camera has been set accordingly, the subject radiograph is photographed on high resolution film as indicated in step 16, and developed in a reversal process, the first developer solution of which employs a 3-pyrazolidone as the primary developing agent, as illustrated in step 18 of FIG. 1.

Full details of photographic chemistry of a negative developing process by which high resolution films may be developed for continuous tones in the negative, and the specialized developing agents used to develop these films to give normal gradations of negative densities, are given in U.S. Pat. No. 3,772,019 of Holden and Weichert, the full text of which is hereby expressly incorporated herein by reference. It is to be noted, however, that U.S. Pat. No. 3,772,019 does not concern conditions for the production of negatives suitable for further processing in a reversal process to yield positive images having gamma values in the range of 1.00 to 1.05, required in the present invention.

Prior to the Holden and Weichert patent, high resolution films had not been capable of being exposed at reasonable exposure indexes, and had not been developable to yield negatives having normal gradations of grey tones. However, the developing process disclosed in U.S. Pat. No. 3,772,019, employing a 3-pyrazolidone as the primary developing agent, as well as a secondary developing agent, overcomes both these problems and produces negatives having extremely high resolution as well as continuous grey tones, suitable for producing high resolution continuous tone prints. In the present invention the conditions of this patent have been modified to produce high resolution intermediate negatives suitable for further processing in a reversal process to yield high resolution positive images. In the reversal process the negatives are first bleached, then reexposed and redeveloped to yield positives in the manner known to the art.

As shown in step 18 of FIG. 1, in the present invention the high resolution film is ultimately processed to a positive image having a gamma value in the range of about 1.00 to about 1.05. To achieve final high resolution positive images having these required contrast ratios, the exposed high resolution film is treated with a first developer solution containing as primary developing agent a 3-pyrazolidone, preferably phenidone, at a concentration of about 0.014 moles per liter to about 0.025 moles per liter, and containing a secondary developing agent, preferably hydroquinone. The developer solution has a molar ratio of primary developing agent to secondary developing agent in the range of about 2.7:1 to about 6.8:1, corresponding to a weight ratio range of about 4:1 to about 10:1. The first developer solution most preferably contains approximately 0.018 moles per liter of the primary developing agent, and approximately 0.006 moles per liter of the secondary developing agent.

It is to be noted that the concentrations of primary and secondary developing reagents shown above are substantially higher than those taught by the Holden and Weichert '019 patent, which concerned the preparation of negatives for printing purposes. The maximum phenidone concentration called for in the '019 patent, is 0.0128 moles per liter, while the minimum phenidone concentration called for in the present invention is 0.014 moles per liter. The '019 patent teaches in column 9 lines 32-43 that when one increases the primary developer to about 0.50 g of phenidone per 240 ml of developer solution (0.0128 moles per liter), the concentration of hydroquinone secondary developer should be reduced to about 0.025 grams per 240 ml of developer solution (0.00094 moles per liter). In the present application the lowest hydroquinone concentration in the first developer solution is 0.00205 moles per liter despite employment of phenidone concentrations above 0.0128 moles per liter.

The pH of the first developer solution is generally in the range 10.0 to 10.5, and preferably about 10.3. The first developer solution is generally employed at a temperature in the range 68° to 95° F., for a time which depends on the developing agents, the concentrations employed, and the temperature selected, but which generally ranges from about 2 minutes to about 10 minutes. Following the first development, the resulting intermediate negative is successively bleached, cleared, reexposed, redeveloped with an active developer, fixed, washed, and dried, in a reversal developing process of the usual kind, as shown by the box labeled 20 in FIG. 1.

An example of a film suitable for use in this invention is Jevaert Copex Pan Rapid, which is a high resolution panchromatic black and white copy film which responds to wavelengths in the range of 400-700 nm. This film is capable, in a good camera/lens system, using the developer described above, of providing 160 lines per mm resolution. It can typically be exposed at an ASA exposure index of 40 to 50 using the developing system discussed above in which a 3-pyrazolidone is the primary developing agent. Other suitable high resolution films are KODAK AHU and FUJI Microfilm HR, both of which are made with a clear base which is necessary for production of a full-range reversal positive image.

For best photoreduction results, gamma values close to 1 are desired in the final positive, as explained above. The ratio of primary developing agent and secondary developing agent in the first developer solution is adjusted for each type of film and for the selected developing agents and conditions, to produce such final gamma values in the positive. Where the film is Copex Pan Rapid, a weight ratio of phenidone to hydroquinone of approximately 4:1 is preferably employed.

In an example of the photographic process of the invention, an industrial radiograph is evenly illuminated from the rear and photographed on 35 mm Jevaert Copex Pan Rapid high resolution film at an ASA exposure index of 40-50, employing a camera which has optics producing no more than 0.1% total distortion. Additional radiographs are similarly photographed until the entire roll of copy film is exposed. In the dark the film is wound on a film-holding reel and placed in a covered developing tank. At this point, the lights are turned on, and all the chemical solutions for the film-developing process are prepared and equilibrated at the temperature desired for the development process, in this example, 68° F. The first developer solution is an aqueous solution of phenidone and hydroquinone containing 0.0185 moles of phenidone per liter and 0.0061 moles of hydroquinone per liter. The first developer solution is poured into the developinq tank and the tank is recapped and struck sharply on the bench to dislodge air bubbles. It is then agitated periodically in a manner known to the art for 3.5 minutes while maintaining the development temperature at 68° F. Next, the first developer is poured out, the film in the tank is rinsed thoroughly with water, and a solution of bleaching agent is added. The bleaching agent may be any conventionally known to the art, a particular one being a sulfuric acid solution of dichromate. After agitating the film in the bleaching agent for two minutes, the bleach is poured out and the top of the developing tank is removed. A clearing bath is next added to the developing tank and the film is agitated, to remove the yellow stain left by the bleaching agent. Any clearing bath conventionally known to the art may be employed, a 9% solution of sodium sulfite being common. The clearing bath is removed and the film is next unwound from the reel and reexposed in room light for approximately one minute, then rewound on the film reel and replaced in the developing tank. Next, the second developer is added to the tank and the film is developed for two minutes at the selected temperature of 68° F. Any conventionally known active developer (as opposed to a compensating developer) may be employed in this step, D-19 and DEKTOL being suitable examples. After the second development step is complete, the second developer is poured out and conventional fixing solution is added to the tank. After agitation for a few minutes, the fixer is poured out and the film is treated successively with a conventional hypo clearing agent, several water washes, and a wetting agent. Finally, the film is removed from the reel, shaken to remove as much liquid as possible, and hung in a clean environment to dry.

Figure 2:
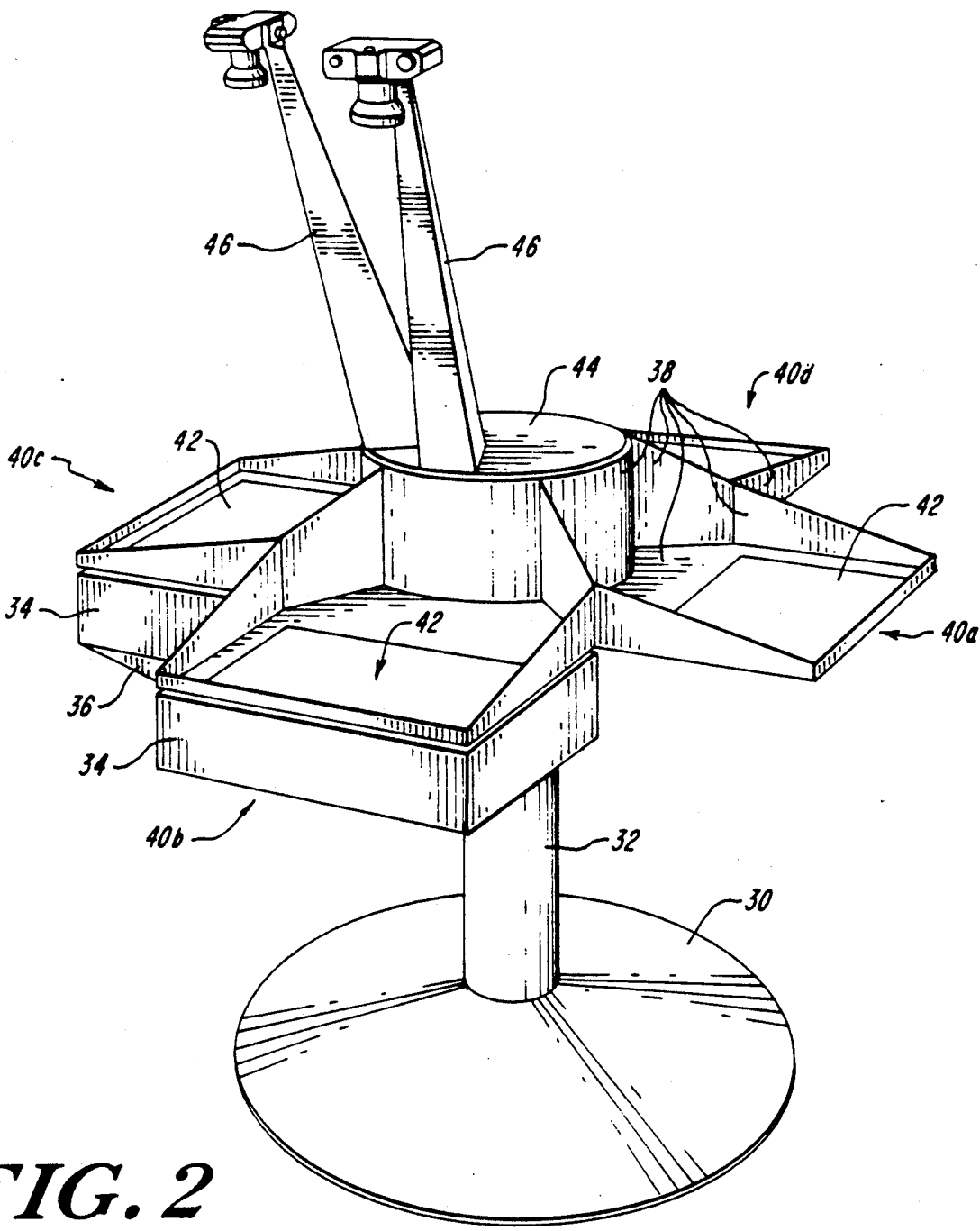
FIG. 2 is a perspective view of the copy stand of the invention.
Figure 3:
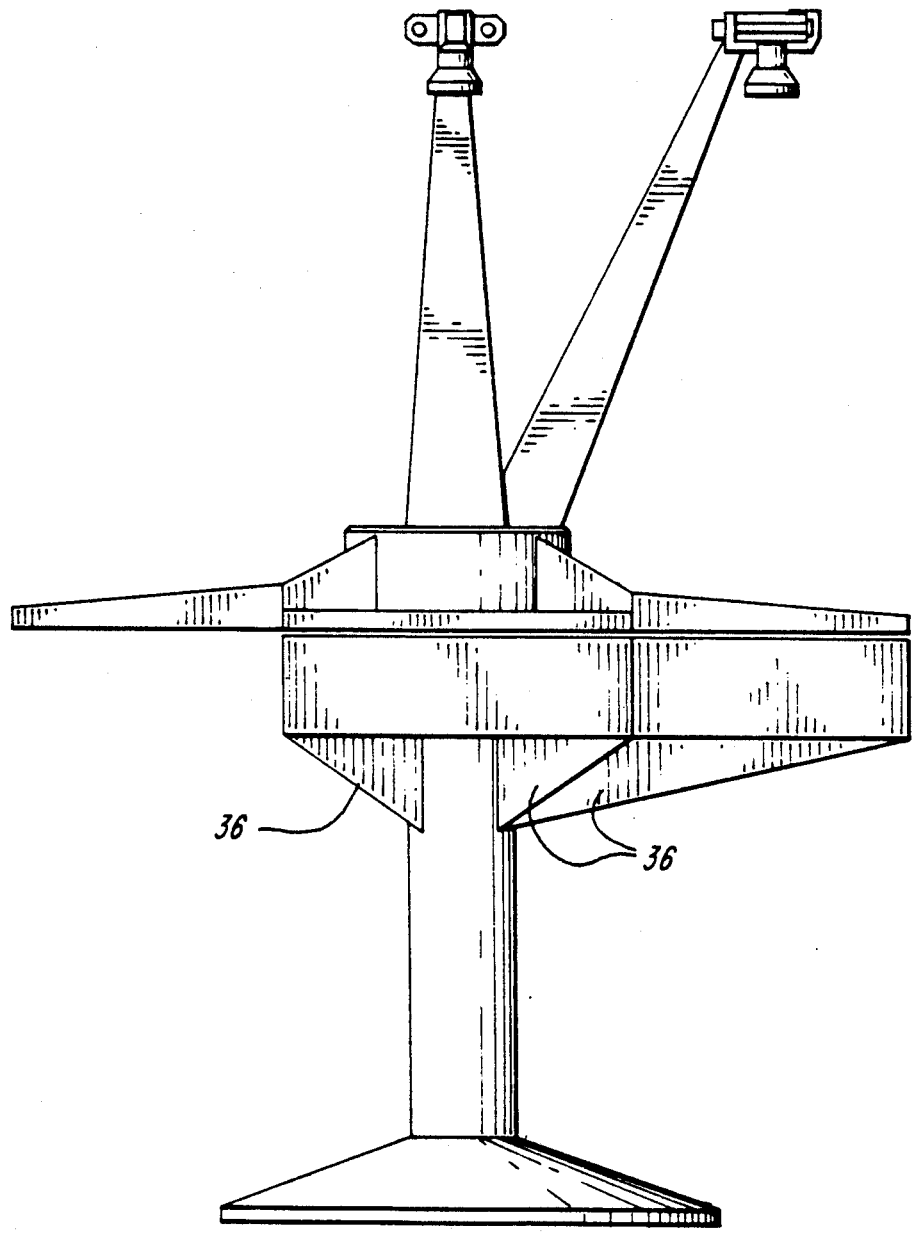
FIG. 3 is a side view of the copy stand.

FIG. 2 shows a perspective view of a photographic copy stand useful in the photoreduction process. It has a base 30 to which is attached a central supporting pedestal 32. Two lightboxes 34 are mounted horizontally on pedestal 32 at an angle of 90 degrees relative to each other and supported by struts 36. These struts are shown more clearly in the side view of the copy stand shown in FIG. 3. Each of the lightboxes 34 provides illumination which is uniform over the entire surface of the lightbox, to within 10% of the illumination nominally provided by the lightboxes. Light sources having a color temperature in the range of 3,800 to 7,000 degrees Kelvin are appropriately employed. One commercially available lightbox having the requisite uniformity of illumination is the Aristo X-ray lightbox, available from Aristo Grid Lamp Products, Inc. In normal operation, the lightboxes are locked on full output to provide maximum stability of operation, and for the case of the Aristo X-ray lightbox, the color temperature of the resulting illumination is approximately 5,800° K.

Figure 4:
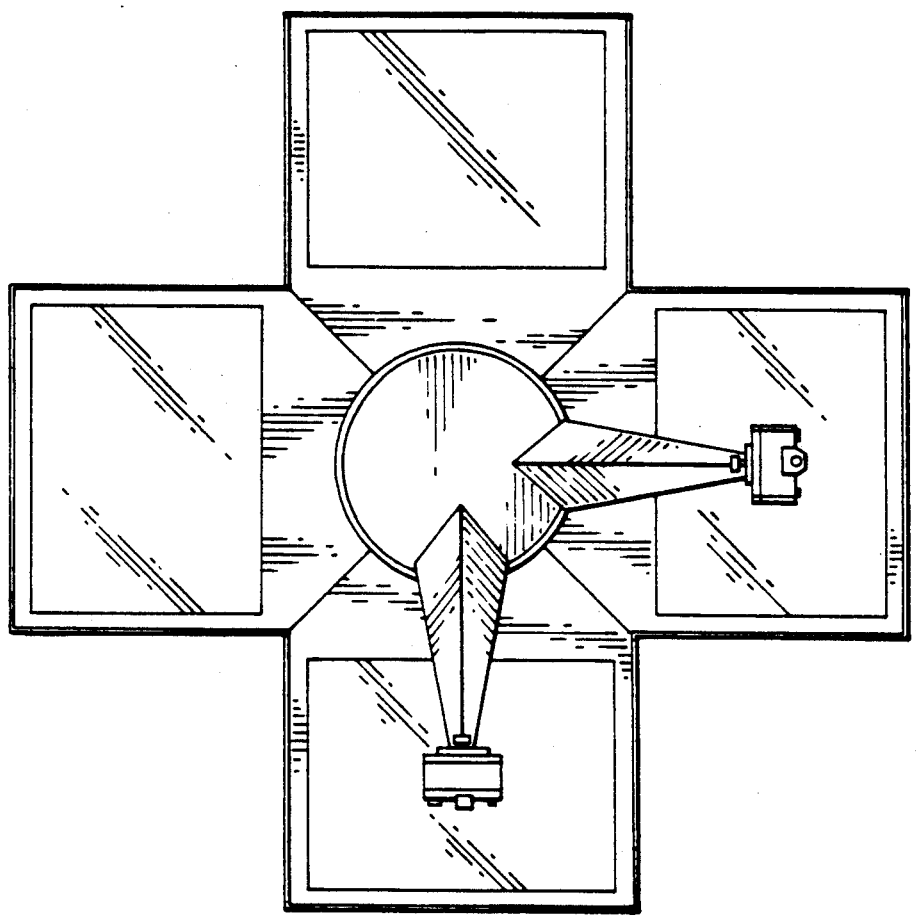
FIG. 4 is a top view of the copy stand.

Above lightboxes 34 is a unitary frame 38 which supports four workstations 40. For purposes of this discussion, the several illustrated workstations 40 are designated 40a, 40b, 40c, and 40d, the letters indicating workstation positions about the copy stand. Thus for example, 40b represents both a workstation 40 and a workstation position b. Frame 38 is attached to pedestal 32 in a manner which permits it to be rotated about the pedestal to selected positions, so that each workstation 40 may be positioned over each of the lightboxes 34 as well as at positions not defined by the presence of lightboxes. The copy stand is provided with a mechanism for holding the workstations in fixed positions when frame 38 is not being rotated to locate the workstations. Any position-retaining mechanism known to the art may be employed, one example being a detent mechanism. Each workstation 40 includes a rectangular clear piece of flat glass 42 at least as large as the largest radiograph which is to be photographed. At the top of pedestal 32 is a platform 44 which carries two camera-supporting arms 46, each of which is shaped and disposed to hold a camera directly over respective ones of the lightboxes 34. FIG. 4 shows the positioning of the two cameras over the workstations.

The copy stand is provided with a vibration reduction feature at each of the workstation positions at which photography is to be carried out. This comprises a ramp mechanism which operates to lift each workstation easel out of frame 38 when it is properly positioned above a lightbox. Thus any vibration in the frame induced by operations being carried out at the set-ups and take-off workstations 40a and 40d are not transmitted to workstation positions 40b and 40c where photography is being carried out.

In operation, a radiograph to be photographed is first placed on one of the workstations adjacent to a lightbox, for example, the workstation indicated in FIG. 2 as 40a. It is properly oriented on glass plate 42 and held in place by means of an adjustable masking system such as a usual photographic enlarger easel, which prevents extraneous light from outside the radiograph from reaching the camera lens. Unitary frame 38 is then rotated clockwise to place the radiograph to be photographed over lightbox 34 located in the adjacent workstation position 40b. A correct exposure is determined, and the camera above this workstation is appropriately set, in accordance with the photographic process described above. The camera located above the workstation position indicated as 40c is set to the same exposure either manually or automatically via appropriate electronics at an appropriate time. After the radiograph at workstation position 40b has been photographed, unitary frame 38 is rotated clockwise 90 degrees to place the radiograph at workstation position 40c where it is again photographed, by the second camera. The taking of identical photographs on each of two separate rolls of film provides duplicate original photoreductions, one of which is archivally stored while the other is kept available for ready reference. Frame 38 is then rotated clockwise a further 90 degrees to place the radiograph at workstation position 40d, where it is removed from the system.

During routine operation four radiographs are handled at any given time by means of this photo stand. While the first radiograph is being photographed at workstation position 40b, a second radiograph is being placed on workstation position 40a and aligned. While the first radiograph is being photographed at workstation position 40c, the second radiograph is being photographed at workstation position 40b, and a third radiograph is being loaded and aligned at workstation position 40a. Finally, when the first radiograph is being unloaded at workstation position 40d, the second radiograph is being photographed at workstation position 40c, the third radiograph is being photographed at workstation position 40b, and a fourth radiograph is being loaded and aligned at workstation position 40a. The cycle continues in this way until all the radiographs have been photographed on each of two separate rolls of film. The films are identically developed and safely stored in two separate locations.

The radiographs are photographed at a 15-fold reduction in size. An identifying legend is preferably placed on each radiograph before it is photographed. Normally this legend is placed along the top or bottom half-inch of the radiograph, in an area containing no information required to be stored. Alternatively, an electronic counter with an illuminated display mounted at or near the plane of focus and at the edge of the light table is employed.

Workpieces to be X-rayed sometimes contain several areas of different thicknesses within the larger area covered by the film being employed. A given film has a given latitude of exposure, outside of which the film will be over- or under-exposed. Thus, when a workpiece having varying thickness is to be X-rayed, it is usually necessary to employ a sandwich of several films having different sensitivities or film speeds, to obtain properly exposed records of the several areas of interest. In the photoreduction of the resulting radiographs, each of the films may be photographed separately, but where each individual radiograph shows or emphasizes certain features of the X-rayed piece either not shown or not clearly shown in the other radiographs of the same piece, it is generally more efficient to photograph the several radiographs superimposed one upon the other so that all of the features of the piece are recorded on one film rather than several. This is easily accomplished on the photographic copy stand of the invention by aligning the several radiographs carefully with respect to each other, placing masks on all sides of the packet of radiographs exactly in the same way masks are employed in photographing single radiographs on this apparatus, then carefully determining a proper exposure and photographing as discussed above. By thus photoreducing several individual radiographs to a single composite film, not only are storage costs of the photographic records reduced, but later reexamination of the X-ray records of the parts under consideration is greatly facilitated since it is unnecessary to examine several individual radiographs.

For the benefits of the high resolution high accuracy photoreproduction process of the invention to be realized, a microfilm reader having equally high resolution is required. Specifically, it is required that an original radiograph not only be photoreduced with no more than 0.1% distortion, but that the resulting reduced negative be viewable at its original scale with no more than 0.1% distortion from the original.

Existing microfilm readers such as mirror and matte screen-based systems commonly employed in libraries are totally inadequate for the task of viewing a negative and permitting measurements of features on the negative with the very high accuracy required for the present purpose.

Figure 5A:
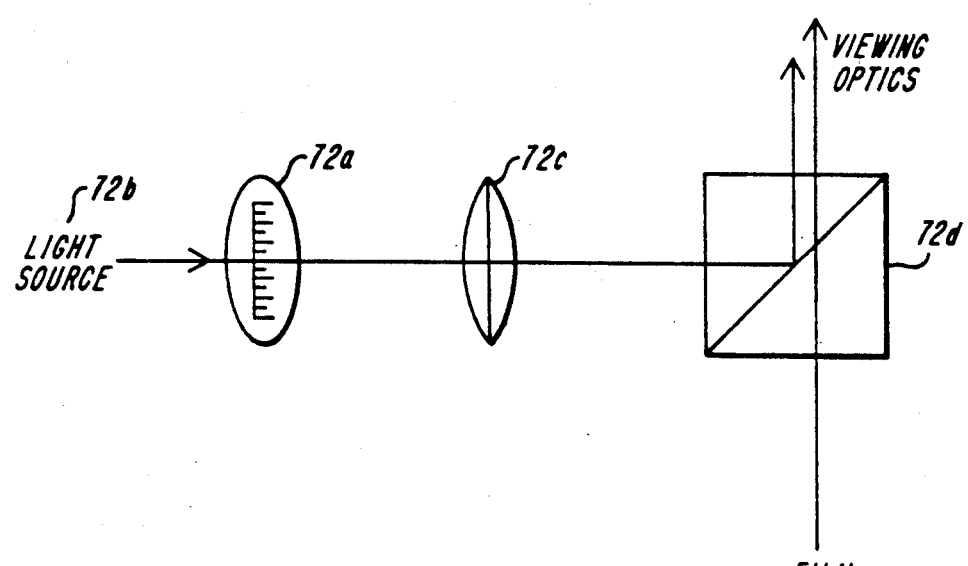
FIG. 5a is a schematic of the reticle assembly.
Figure 5:
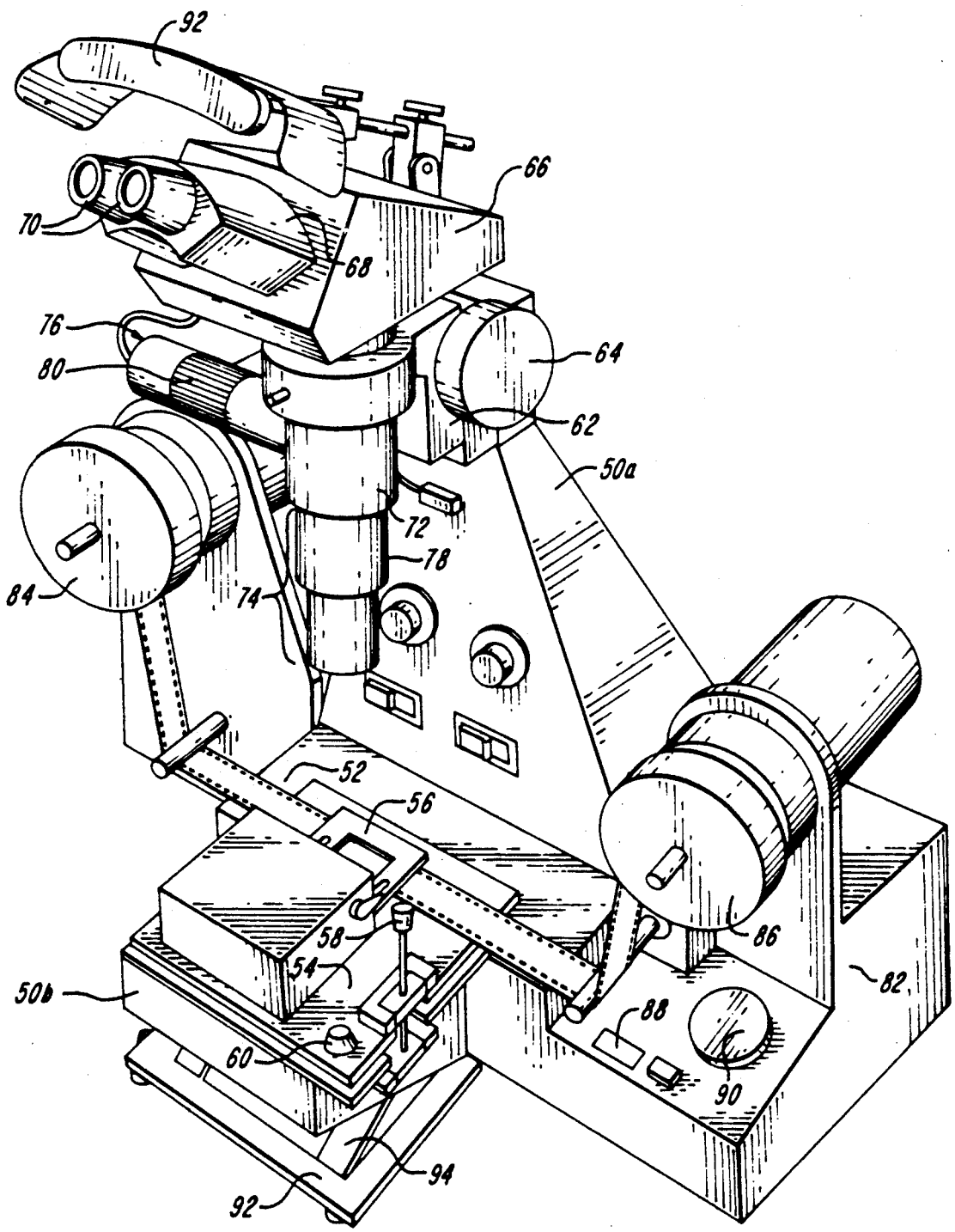
FIG. 5 is a perspective view of the high resolution microfilm reader of the invention.

The high resolution microfilm reader of the invention is shown in FIG. 5 and possesses a supporting chassis 50 which has a generally upright section 50a and a base section 50b. The upright section 50a is contiguous with one side of the base section 50b, the combination of sections thus forming a generally L-shaped unit.

The base section has an upper surface 52 which includes a diffuser, such as an opal diffuser, which is not shown in FIG. 5 but is located below the film holder 56 and movable platform 54 to be discussed below. This diffuser is slightly larger than a 15×reduction of the largest radiograph to be accommodated, or about 26×30 mm. Supporting chassis base section 50b includes means (not shown) for illuminating the diffuser from its underside and is typically a light source such as a fluorescent tube. This will typically have a color temperature of about 5,500° K. The light source may be located directly below the diffuser or may be located elsewhere within the chassis, its light then being directed to the diffuser by means of appropriate reflectors.

Located on the top surface of chassis base section 50b is a movable platform 54. This platform is mounted on chassis base section 50b so that it rides slightly (about ¼ inch) above base section surface 52. Platform 54 also has an opening located above the diffuser. This opening is not shown in FIG. 5 but is located below the film holder 56 to be discussed below.

A film holder 56 is mounted on movable platform 54 above the opening in the platform. Film holder 56 is preferably a pressure plate in the shape of a frame having an opening the size of the film frame to be held. In operation, a film frame to be examined is placed between film holder 56 and movable plate 54, then movable plate 54 is positionally adjusted in the horizontal plane by movement of positioning control 58. It is locked in the desired position by a positioning lock 60. The spacing between the diffuser and movable plate 54 prevents any specks of foreign material on the diffuser from being in focus when a film being examined is in focus.

A focusing mount 62 is movably attached to the top of the chassis upright section 50a above chassis base section 50b. This attachment is preferably by means of a rack and pinion mechanism, not shown in FIG. 5. Vertical adjustment is provided by turning focusing knob 64.

Mounted on the top of focusing-mount 62 is a binocular microscope head 66 which includes eyepiece tubes 68. Attached to eyepiece tubes 68 are ultrawide angle eyepieces 70, providing 15 power magnification. Eyepieces having other magnifications could in principle be employed. Mounted below focusing mount 62 is a beam splitter assembly housing 72 which contains a beam splitter shown in FIG. 5a as 72d. The beam splitter is preferably a beam splitter cube as shown in the figure. The bottom of beam splitter assembly housing 72 is configured to connect with a variable magnification objective lens 74, and the side of beam splitter assembly housing 72 is similarly configured to accept a reticle assembly 76.

Objective lens 74 is a zoom lens providing a magnification range of from somewhat less than 1:1 to approximately 4.5:1. It is capable of viewing the full frame of film being examined, in contrast to a microscope objective lens, which would only cover a small portion of the total field of a sample. The actual magnification provided by the lens is adjusted by magnification control 78.

Reticle assembly 76 is attached to the side of beam splitter assembly housing 72 and is shown schematically in FIG. 5a. It contains a reticle 72a, a variable intensity light source 72b, and at least one optical element 72c to project an image of the reticle into the beam splitter 72d. The reticle may be rotated to any desired orientation by means of the reticle position control 80.

Mounted along side of chassis base section 50b is a film transporting mechanism 82 which moves a strip of film under objective lens 74 for viewing. This film transport mechanism includes a film supply spool 84, a film take-up spool 86, an idler roller having alternating reflective and matte sections on its end, each of which corresponds to one frame, and which are sensed by an optical switch to provide an input to a film counter, the output of which is shown as 88 in FIG. 5, film tension control circuitry, and a motor/generator in each side of the film transport mechanism to drive each spindle and supply the film control circuitry with data necessary to keep proper film tension. Also included is a control 90 for moving the film in forward and reverse directions and controlling its speed.

A headrest 92 is optionally attached to the top of binocular microscope head 66 to enhance the user's comfort.

In this system, each of the optical elements, that is, the binocular microscope head, the eyepiece tubes, the ultrawide angle eyepieces, the beam splitter assembly, the objective lens, and the reticle assembly, is a high precision optical component, and the optical system taken as a whole has no more than 0.1% total distortion. 1 To further enhance the user's comfort, the bottom of the unit is configured such that when the unit is set on a flat horizontal surface, it tips forward toward the user. An adjustable elevator fool 92 is attached to the underside of the chassis base section 50b to permit raising the unit back to a vertical orientation in stages. The forward portion of the adjustable elevator foot 92 is located near the observer while the rear portion of the elevator foot is attached to the underside of the chassis base section near the rear of the unit by means of a hinge. A support piece 94 is hinged to the front portion of the elevator foot 92 and is set to one of a number of detent positions on the underside of chassis base section 50b in order to fix a desired tilt angle for the microscope reader.

A number of the parts of the high resolution reader are commercially available. These parts and their respective suppliers are listed below. Focusing mount 62 is a Nikon focusing mount No. 76012. Binocular microscope head 66 is a Nikon Binocular Body Tube B, No. 79004. Between the focusing mount and the microscope head is Binocular Adaptor by Amarel Precision Instruments Company, No. 284006. The eyepieces 70 are made by Bausch and Lomb, No. 31-15-74-02. Beam splitter assembly 72 and reticle assembly 76 are a Reticle Projector Assembly produced by Amarel Precision Instruments. Company, No. 287004. The lamp for this unit is No. 296004 of Amarel Precision Instruments Company, which also supplies a dimmer control, No. 276007. Objective lens 74 is a Variable Magnification Objective by Amarel Precision Instrument Company, No. 29901. The film transporting mechanism 82 and associated apparatus is a Motorized Roll Film Attachment Model PP by the Micro Design division of Bell & Howell. The reflector, mirrors, and diffuser of the illumination system for the reader are by American Photo Systems, Inc., and the illumination system includes type 7452 lamps for a Durst 601 enlarger, and an Aristo Attenuator, available from Aristo Grid Lamp Products, Inc.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A high resolution microfilm reader including an optical system having no more than 0.1% total distortion, comprising:
   a supporting chassis;
   a focusing mount adjustably attached to said chassis;
   a binocular microscope head attached to said focusing mount and having first and second eye piece tubes and corresponding first and second ultrawide-angle eye pieces;
   a beam splitter assembly attached to said focusing mount and having a beam splitter housing;
   a variable magnification objective lens, attached to said beam splitter housing, for providing said beam splitter assembly with an image of a microfilm being viewed;
   a reticle assembly, attached to said beam splitter housing and having a rotatable calibrated reticle for measuring features of said microfilm image being viewed, and means including at least one optical component for projecting an image of said reticle into said beam splitter assembly; and
   said beam splitter assembly further including a beam splitter, for receiving said image of a microfilm being viewed and said reticle image, and for simultaneously providing both of said first and second eye pieces with said image of a microfilm being viewed and said reticle image.

2. The reader of claim 1 wherein said chassis further includes a base section having an upper surface which includes a diffuser.

3. The reader of claim 2 wherein said chassis base section includes means for illuminating said diffuser from the underside.

4. The reader of claim 2 wherein said chassis base section further comprises a movable platform slightly spaced above said base section upper surface, said platform having an opening above said diffuser.

5. The reader of claim 4 wherein said movable platform further comprises means for holding a film across said opening in said platform.

6. The reader of claim 5 wherein said means for holding comprises a pressure plate having an opening therethrough at least the size of said film.

7. The reader of claim 2 further comprising means for transporting strip film between said objective lens and said upper surface of said chassis base section, said transporting means including means for maintaining a desired tension on said strip film, means for counting frames, and means for moving said strip film in forward and reverse directions at a desired speed.

8. The reader of claim 1 wherein said ultrawide-angle eyepieces are 15×magnification.

9. The reader of claim 1 wherein said objective lens is a zoom lens providing a magnification range of from somewhat less than 1:1 to approximately 4.5:1.

10. The reader of claim 1 wherein said reticle assembly projecting means further comprises an adjustable light source.

11. The reader of claim 1 further comprising means for tilting said reader from a generally upright orientation toward an observer to one of a plurality of orientations at angles from said upright orientation.

12. A high resolution microfilm reader, comprising:
    a supporting chassis having a generally upright section and a base section, said upright section having a top and being contiguous with one side of said base section, said base section having an upper and a lower surface;
    a focusing mount having top and bottom sides, adjustably attached to the top of said chassis upright section above said chassis base section such that the vertical position of said mount relative to said chassis may be adjusted;
    a binocular microscope head, attached to the top side of said focusing mount, said binocular head further comprising eyepiece tubes and ultrawide angle eyepieces;
    a beam splitter assembly, attached to the bottom side of said focusing mount, said beam splitter assembly further comprising a beam splitter cube and a housing for holding said beam splitter cube, said housing having a bottom and a side configured respectively to connect with first and second image forming systems, for simultaneously providing first and second images to each eyepiece of said binocular microscope head;
    a variable magnification objective lens, attached to the bottom of said beam splitter housing, said objective lens constituting said first image forming system for providing said first image;
    a reticle assembly, attached to the side of said beam splitter housing, said reticle assembly constituting said second image forming system for providing said second image, and further comprising a reticle, a light source, and at least one optical component capable of projecting an image of said reticle into said beam splitter cube; and
    the optical system of said microfilm reader taken as a whole having no more than 0.1% total distortion.

* * * * *

UNITED STATES PATENT AND TRADEMARK OFFICE
CERTIFICATE OF CORRECTION

PATENT NO. : 5,024,512

DATED : June 18, 1991

INVENTOR(S) : Arnold H. Greene and Harold E. Holden

It is certified that error appears in the above-identified patent and that said Letters Patent is hereby corrected as shown below:

On the title page:
In section [56] References Cited, after the title FOREIGN PATENT DOCUMENTS, "1235006 2/1967 France" should read --1235006 2/1967 Fed. Rep. of Germany--.

Column 9, line 53, "focusing-mount" should read --focusing mount--.

Column 10, line 38, "1 To further enhance" should read --To further enhance--.

Column 10, line 41, "fool 92" should read --foot 92--.

Column 10, line 63, "Instruments. Company" should read --Instruments Company--.

Signed and Sealed this

Sixth Day of April, 1993

*Attest:*

STEPHEN G. KUNIN

*Attesting Officer*      *Acting Commissioner of Patents and Trademarks*